United States Patent [19]

Hosako et al.

[11] Patent Number: 5,202,183
[45] Date of Patent: Apr. 13, 1993

[54] ALKALI-RESISTANT SYNTHETIC FIBER

[75] Inventors: Yoshihiko Hosako; Yoshifumi Furutani; Takashi Tabuchi, all of Hiroshima; Yasushi Yamaguchi, Aichi, all of Japan

[73] Assignee: Mitsubishi Rayon Co., Ltd., Tokyo, Japan

[21] Appl. No.: 707,941

[22] Filed: May 28, 1991

Related U.S. Application Data

[63] Continuation of Ser. No. 377,950, Jul. 11, 1989, abandoned.

[30] Foreign Application Priority Data

Jul. 11, 1988 [JP] Japan ............................ 63-170991
Mar. 29, 1989 [JP] Japan ............................ 1-74848

[51] Int. Cl.$^5$ ............................................. D02G 3/00
[52] U.S. Cl. ............................. 428/364; 525/189; 162/157.3; 162/157.5; 428/357
[58] Field of Search ............. 428/364, 357; 525/189; 162/157.3, 157.5

[56] References Cited

U.S. PATENT DOCUMENTS

| | | | |
|---|---|---|---|
| 3,920,507 | 11/1975 | Yonemori | 162/157.5 |
| 4,051,300 | 9/1977 | Klein et al. | 428/398 |
| 4,197,148 | 4/1980 | Shinomura | 264/234 |
| 4,822,382 | 4/1989 | Nelson | 428/394 X |
| 4,942,091 | 7/1990 | Umezawa et al. | 428/398 |

Primary Examiner—Patrick J. Ryan
Assistant Examiner—N. Edwards
Attorney, Agent, or Firm—Oblon, Spivak, McClelland, Maier & Neustadt

[57] ABSTRACT

An alkali resistant synthetic fiber and a sheeting obtained therefrom are disclosed, the fiber being comprised of a polymer mixture consisting of (A) from 15 to 80% by weight of polysulphone, (B) from 20 to 85% by weight of polyvinyl chloride having a degree of polymerization of from 800 to 2,500, and (C) up to 65% by weight of other vinyl polymer, each based on the total weight of the components (A), (B), and (C). The sheeting is excellent in alkali resistant in high temperatures and liquid retention and is therefore useful as industrial filters, battery separators, and industrial wipers.

8 Claims, No Drawings

ALKALI-RESISTANT SYNTHETIC FIBER

This application is a continuation of application Ser. No. 07/377,950 filed Jul. 11, 1989, now abandoned.

FIELD OF THE INVENTION

This invention relates to a synthetic fiber useful as a material of sheetings which are required to have alkali resistance, such as filters, battery separators, and industrial wipers.

BACKGROUND OF THE INVENTION

In recent years, fibrous sheetings have broadened the application to be made of them and have been widely employed in various industrial fields as industrial filters, battery separators, industrial wipers, etc.

Performance properties required for the sheets to be used as filters, separators or wipers include moderate permeability to air and liquids, proper strength, thickness and density, and high liquid retention. With the recent developments in industry, a demand for chemical resistance is also increasing. For example, sheets for use as filters for treating waste acids or waste alkalis or battery separators are required to exhibit chemical resistance enough to save themselves from elution or deterioration due to strong acids or strong alkalis. In particular, sheets for use as battery separators are demanded to have excellent alkali resistance in high temperatures as well as high liquid retention.

The sheet for use as battery separators have conventionally been prepared chiefly from polyamide fibers or polypropylene fibers. Sheets made of polyamide fibers, though excellent in liquid retention, have poor alkali resistance in high temperatures, which has been a cause of reducing a battery life through repetition of discharge and recharge. Sheets made of polypropylene fibers are excellent in alkali resistance in high temperatures but poor in liquid retention, thus causing reduction of a battery life similarly to the polyamide fibers.

SUMMARY OF THE INVENTION

An object of the present invention is to provide a synthetic fiber excellent in alkali resistance in high temperatures and liquid retention.

Another object of the present invention is to provide a fiber material for producing a sheet suitable for use as industrial filters, battery separators and industrial wipers for which alkali resistance in high temperatures is required.

A further object of the present invention is to provide a sheeting excellent in alkali resistance and liquid retention.

The present invention provides an alkali-resistant synthetic fiber comprising a polymer mixture consisting of (A) from 15 to 80% by weight of polysulphone, (B) from 20 to 85% by weight of polyvinyl chloride having a degree of polymerization of from 800 to 2,500, and (C) up to 65% by weight of other vinyl polymer, each based on the total weight of the components (A), (B), and (C).

DETAILED DESCRIPTION OF THE INVENTION

The polysulphone, one of the essential component constituting the fiber of the present invention is a polymer containing a —SO$_2$— group, and is not particularly limited in the degree of polymerization. Preferred polysulphone includes aromatic polysulphones comprising a repeating unit represented by formula (I) or (II):

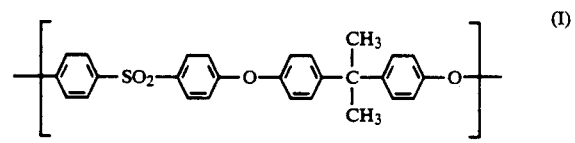

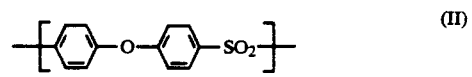

Specific examples of the polysulphone having a repeating unit of formula (I) include "Udel polysulphone P-3500" and "Rodel polysulphone", registered trade names of Amoco Performance Products Inc. and "Astrel (polysulphone)", a trade name of Carborundum Corp., and those having a repeating unit of formula (II) include "Polyether sulphone 4100P and 4800P", trade names of Imperial Chemical Industries Ltd.

The polyvinyl chloride, another essential component of the fiber, has a degree of polymerization of from 800 to 2,500, preferably from 900 to 1,800, as determined according to JIS-6721. A degree of polymerization less than 800 results in fiber strength of less than 1.2 g/d only to provide a sheeting having insufficient strength. If the degree of polymerization exceeds 2,500, the spinning dope for fiber forming is liable to gel, making it difficult to stably produce fibers.

The other vinyl polymers which can be used as an optional component of the fiber are selected from polymers which are excellent in alkali resistance and soluble in a solvent used for spinning. Such vinyl polymers include polymethyl methacrylate, polystyrene, and styrene/acrylic ester copolymers. From the standpoint of spinnability, polymethyl methacrylate and polystyrene are particularly preferred.

The polymer mixture constituting the fiber consists of (A) from 15 to 80% by weight of polysulphone, (B) from 20 to 85% by weight of polyvinyl chloride having a degree of polymerization of from 800 to 2,500, and (C) up to 65% by weight of other vinyl polymer, each based on the total weight of the components (A), (B), and (C). If the polysulphone content is less than 15% by weight, the resulting fiber has reduced dimensional stability under heat, the passage through sheet forming processes is deteriorated, and the sheet prepared in the form of knitted or woven fabric has reduced dimensional stability under heat. If it exceeds 80% by weight, the strength and extensibility of the resulting fiber are too low to be suited as a material of sheetings. If the polyvinyl chloride content is less than 20% by weight, the strength of the resulting fiber is too low to provide practically useful sheetings. If it exceeds 85% by weight, the resulting fiber has an increased percentage of shrinkage in boiling water, reduced dimensional stability under heat, and reduced strength. If the content of other vinyl polymer exceeds 65% by weight, drafting properties in fiber formation are deteriorated, making it extremely difficult to obtain fibers.

The fiber according to the present invention is prepared from the above-described polymer mixture preferably by wet spinning. A solvent for wet spinning includes dimethylacetamide, dimethylformamide, dimethyl sulfoxide, and acetone, with dimethylacetamide and dimethylformamide being preferred. The polysulphone, polyvinyl chloride and, if desired, other vinyl polymer are dissolved in the solvent at a prescribed ratio to prepare a spinning solution. The spinning solution preferably has a viscosity of from 100 to 2,000 poise, more preferably from 150 to 1,000 poise, at 50° C. The polymer concentration in the spinning solution is so adjusted to provide the viscosity falling within the above-recited range. It is preferable that the polymer concentration does not exceed 50% by weight from the viewpoint of prevention of gelation. The spinning solution may further contain small amounts of additives, such as heat-resistant stabilizers.

The spinning solution is extruded through a spinning nozzle into a coagulating bath in the form of fiber. The hole diameter of the spinning nozzle is selected appropriately according to the desired fineness of fiber. A coagulating agent to be used in the coagulating bath includes non-solvents for each polymer, such as water and alcohols, with water being preferred in industrial production. In addition to the coagulating agent, the coagulating bath further contains the same solvent as used in the spinning solution. The ratio of the coagulating agent to the solvent and the temperature of the coagulating bath are appropriately determined depending on the kind of the polymers, the mixing ratio of the polymers, and the rate of spinning.

Fibers taken out of the coagulating bath are washed, subjected to drafting to be endowed with mechanical properties such as strength, followed by, if necessary, drying in a usual manner to obtain the fiber of the present invention either in a dried or undried state.

The fibers can be obtained in any form of filaments, staple fibers, tow, etc. While the section of the fiber is not particularly limited, profiles having a Y-shaped section, a cross-shaped section, etc. provide an increased void between fibers when formed into a sheet to ensure high liquid retention, as compared with general fibers having a circular section.

In the present invention, fine fibers having a single fiber fineness of 3 denier or smaller can be produced. Use of such fine fibers results in thin sheetings which are advantageous to cope with the demand for size reduction of batteries.

The fiber according to the present invention exhibits excellent alkali resistance in high temperature. More specifically, when the fiber is soaked in a boiling 30 wt % aqueous solution of potassium hydroxide for 1 hour under atmospheric pressure, the loss in weight of the fiber is 2.0% by weight or less.

The fiber of the present invention has a liquid retention of 25% by weight or more as measured according to the following method. The liquid retention properties of the fiber are ascribed to the void in the fibers and effectively assure liquid retention properties of the sheeting obtained therefrom.

Method of Determining Liquid Retention of Fiber

The fibers are immersed in water for 24 hours and then dehydrated by centrifugation at a loading of 10 G for 10 minutes, and the weight of the wet fibers ($W_1$) is measured. The wet fibers are dried at 80° C., and the dry weight ($W_2$) is measured. Liquid retention (%) of the fiber can be calculated from equation:

$$\text{Liquid Retention (\%)} = \frac{W_1 - W_2}{W_2} \times 100$$

The percentage of shrinkage in boiling water of the fiber according to the present invention is 25% or less.

The fiber thus shows smooth passage through processes for sheet formation, and the resulting sheetings exhibit satisfactory dimensional stability under heat for practical use.

The fiber of the invention can be formed into various forms of sheetings, such as non-woven fabric, paper, woven fabric, and knitted fabric, as selected according to the end use. For example, woven fabric is suitable for use as industrial filters requiring strength, and paper manufactured by wet process is suitable for use as battery separators requiring uniformity. There are various processes for forming sheetings to select from. Since a wet paper manufacturing process can be applied to the undried fiber as obtained, it is advantageous for process simplification and energy saving. The fiber of the present invention in the form of yarn can be woven or knitted to obtain woven or knitted fabric. In order to make full use of the characteristics of the fiber of the present invention, it is necessary that the sheetings should contain at least 50% by weight of the fiber of the invention. If desired, the sheetings may contain other fibers as long as they do not impair the alkali resistance and liquid retention as demanded. Examples of the other fibers which can be used in combination include polyethylene fiber, polypropylene fiber, and polyvinyl chloride fiber.

In the case of non-woven fabric or paper, strength of the sheeting may be improved by fusing the fibers under heat. In order to facilitate the heat fusion, it is desirable to incorporate a binder fiber into the sheeting and to heat the sheeting at a temperature above the heat fusion temperature of the binder fiber. Such a binder fiber includes polyethylene or polyvinyl chloride fibers having a heat fusion temperature of not more than 125° C., preferably not more than 120° C. The binder fiber is used in an amount of 10% by weight or more, preferably 15% by weight or more. However, the binder fiber in a proportion exceeding 50% by weight results in reduction of liquid retention of the sheeting.

The sheeting obtained from the fiber of the present invention has a liquid retention of 220% by weight or more as determined according to the following method. Such a high liquid retention, attained by not only the voids of the sheetings but also the voids of the fibers per se, produces excellent effects in application to uses requiring high liquid retention performance.

Method for Determining Liquid Retention of Sheeting

Three specimens having a size of 5 cm × 5 cm are cut out of a sample sheet and weighted ($W_i$). The specimens are immersed in water at 20° C. for 1 hour, taken out from water, hung for 10 minutes to let water drop off, and then weighed ($w_i$). Liquid retention (%) can be calculated from equation:

$$\text{Liquid Retention (\%)} = \frac{1}{3} \times \left( \sum_{i=1}^{3} \frac{w_i - W_i}{W_i} \right) \times 100$$

The liquid retention can be increased by subjecting the sheet to treatment for rendering hydrophilic, such as treatment with a surface active agent, plasma treatment, and corona discharge treatment.

Since the fiber according to the present invention is excellent in alkali resistance and liquid retention, it is useful as a material to provide sheetings having excellent alkali resistance and liquid retention. The sheet made of the fiber is extremely useful as an industrial filter, such as a filter for handling waste alkalis, and a battery separator in silver oxide batteries, mercury batteries, air batteries, alkali-manganese batteries, nickel-zinc batteries, nickel-cadmium batteries, and alkali accumulators.

The present invention is now illustrated in greater detail with reference to the following examples, but it should be understood that the present invention is not deemed to be limited thereto. In these examples, all the percents and ratios are by weight unless otherwise indicated.

EXAMPLE 1

Polyvinyl chloride (hereinafter abbreviated as PVC) having a degree of polymerization of 1,100 and "Udel Polysulphone P-3500" (polysulphone resin produced by Amoco Performance Products Inc.) (hereinafter abbreviated as PSF) were dissolved in dimethylacetamide at a mixing ratio shown in Table 1 below to prepare a spinning solution. The solids content (polymer concentration) of the spinning solution was adjusted so as to provide a viscosity of about 200 poise at 50° C. The spinning solution was extruded into a coagulating bath consisting of 70% of dimethylacetamide and 30% of deionized water at a bath temperature of 30° C. The resulting undrafted filaments were drafted in warm water at 70° C. at a draft of about 4, washed with boiling water, and dried at room temperature for 24 hours to obtain fibers (hereinafter referred to as PSV fibers, Sample Nos. 1 to 4). Performance properties of the resulting PSV fibers are shown in Table 1.

TABLE 1

| | Sample No. | | | |
|---|---|---|---|---|
| | No. 1 | No. 2 | No. 3 | No. 4 |
| PVC/PSF Mixing Ratio (%) | 70/30 | 80/20 | 90/10 | 10/90 |
| Weight Loss on KOH Treatment (%)* | 1.1 | 1.7 | 1.2 | 0.2 |
| Liquid Retention (%) | 45.0 | 52.3 | 50.0 | 67.2 |
| Percentage of Shrinkage in Boiling Water (%) | 18.0 | 21.0 | 65.0 | 9.2 |
| Fineness (d) | 1.02 | 1.72 | 1.41 | 0.98 |
| Strength (g/d) | 2.0 | 2.0 | 1.7 | 0.75 |
| Elongation (%) | 24.0 | 23.0 | 21.3 | 18.6 |
| Remark | Invention | | Comparison | |

Note:
*Treated in a boiling 30% aqueous solution of potassium hydroxide under atmospheric pressure for 1 hour.

As is clear from Table 1, when the PSF content is less than 15%, the percentage of shrinkage in boiling water is high (Sample No. 3), and when the PSF content is in excess of 80% and the PVC content is less than 20%, the fiber strength is low (Sample No. 4). The increment of the percentage of shrinkage in boiling water deteriorates the passage through sheet forming processes and the decrease of the fiber strength couldn't provide practically useful sheetings.

EXAMPLE 2

PVC having a degree of polymerization of 1,100, polymethyl methacrylate (hereinafter abbreviated as PMMA) having a degree of polymerization of 950, and the same PSF as used in Example 1 were dissolved in dimethylacetamide at a mixing ratio shown in Table 2 to prepare a spinning solution. The solids content (polymer concentration) of the spinning solution was adjusted so as to have a viscosity of about 200 poise at 50° C. The spinning solution was extruded into a coagulating bath at 30° C., consisting of 60% of dimethylacetamide and 40% of deionized water to obtain undrafted fibers. The fibers were drafted in boiling water at a draft of about 3, washed in boiling water, and dried at room temperature to obtain PSV fibers (Sample Nos. 5 to 8) having a fineness of about 1 denier. The performance properties of the resulting PSV fibers are shown in Table 2.

TABLE 2

| | Sample No. | | | |
|---|---|---|---|---|
| | No. 5 | No. 6 | No. 7 | No. 8** |
| PVC/PMMA/PSF Mixing Ratio (%) | 30/50/20 | 40/40/20 | 50/30/20 | 10/70/20 |
| Weight Loss on KOH Treatment (%)* | 0.93 | 1.05 | 1.59 | —* |
| Liquid Retention (%) | 45.0 | 49.0 | 46.0 | — |
| Percentage of Shrinkage in Boiling Water (%) | 18.0 | 19.1 | 18.8 | — |
| Fineness (d) | 0.93 | 1.01 | 0.98 | — |
| Strength (g/d) | 1.29 | 1.39 | 1.35 | — |
| Elongation (%) | 33.1 | 31.5 | 32.5 | — |

Note:
*Unmeasured because of poor extensibility.
**Comparative Sample

As is clear from Table 2, Sample Nos. 5-7 of the present invention have excellent properties, but Sample No. 8 for comparison, of which the PMMA content is higher than 65%, is poor in drafting properties in fiber formation and spinning couldn't be made.

EXAMPLE 3

PSV fibers (Sample Nos. 9 to 11) were obtained in the same manner as in Example 2, except for changing the degree of polymerization of PVC as shown in Table 3 below and using PVC/PMMA/PSF at a mixing ratio of 30/50/20. The performance properties of the resulting fibers are shown in Table 3.

TABLE 3

| | Sample No. | | | |
|---|---|---|---|---|
| | No. 9** | No. 5 | No. 10 | No. 11** |
| PVC Polymerization Degree | 600 | 1,100 | 1,900 | 2,900 |
| Percentage of Shrinkage in Boiling Water (%) | 19.5 | 18.0 | 17.0 | —* |
| Fineness (d) | 1.00 | 0.93 | 1.01 | — |
| Strength (g/d) | 0.80 | 1.29 | 1.42 | — |
| Elongation (%) | 30.8 | 33.1 | 31.5 | — |

Note:
*Unmeasured because of incapability of spinning.
**Comparative Sample

As is clear from Table 3, when the degree of polymerization of the PVC is less than 800 as in Sample No.9, the thus obtained fiber strength is insufficient, and on the other hand when the degree of polymerization exceeds 2,500 as in Sample No. 11, the gelation of the spinning dope for fiber forming is accelerated for a short time and spinning couldn't be made.

EXAMPLE 4

PVC having a degree of polymerization of 1100, polystyrene having a molecular weight of from 150,000 to 200,000, and the same PSF as used in Example 2 were dissolved in dimethylacetamide at a mixing ratio of 50/30/20 to prepare a spinning solution. The solids content (polymer concentration) of the spinning solution was adjusted so as to have a viscosity of about 200 poise at 50° C. The spinning solution was spun in the same manner as in Example 2 to obtain PSV fibers having a fineness of 1.0 denier, a strength of 1.22 g/d, an elongation of 27.8%, and a percentage of shrinkage in boiling water of 21.5% (Sample No. 12). The weight loss on KOH treatment and liquid retention of the resulting PSV fibers were found to be 1.09% and 71.2%, respectively.

EXAMPLE 5

PSV fibers (Sample No. 13) having a fineness of 1.01 denier, a strength of 2.1 g/d, an elongation of 24%, and a percentage of shrinkage in boiling water of 18.2% were obtained in the same manner as in Example 1, except for using PVC having a degree of polymerization of 1,100 and "Polyether sulphone 4800P" (polyether sulphone resin produced by Imperial Chemical Industries Ltd.) at a mixing ratio of 70/30. The weight loss on KOH treatment and liquid retention of the resulting PSV fibers were found to be 1.4% and 61%, respectively.

EXAMPLE 6

PVC having a degree of polymerization of 1,100, PMMA having a degree of polymerization of 980, and the same PSF as used in Example 1 were dissolved in dimethylacetamide at a mixing weight of 30/50/20 to prepare a spinning solution. The solids content (polymer concentration) of the spinning solution was adjusted so as to have a viscosity of about 200 poise at 50° C. The spinning solution was extruded into a coagulating bath at 30° C. consisting of 60% of dimethylacetamide and 40% of deionized water to obtain undrafted fibers. The fibers were drafted in boiling water at a draft of about 3, washed in boiling water to obtain PSV fibers (Sample No. 14), and collected without drying. The weight loss on KOH treatment, liquid retention, and percentage of shrinkage in boiling water of the resulting PSV fibers were found to be 0.93%, 45.0%, and 18.0%, respectively.

The PSV fibers were bundled without drying and cut to 6 mm lengths while wetted and mixed with binder fibers comprising a vinyl chloride-vinyl acetate copolymer having a heat fusion temperature of 110° C. (2 denier, cut length: 6 mm) at a mixing ratio shown in Table 4. The mixed fibers were processed according to a wet paper manufacturing process and then subjected to heat fusion treatment at 115° C. to obtain a sheet having a basis weight of 50 g/m² (Sheet Nos. 1 to 5). The performance properties of the resulting sheets are shown in Table 4.

TABLE 4

|  | Sheet No. | | | | |
| --- | --- | --- | --- | --- | --- |
|  | No. 1 | No. 2 | No. 3 | No. 4 | No. 5* |
| PSV Fiber No. 14/ Binder Fiber Mixing Ratio (%) | 90/10 | 80/20 | 70/30 | 50/50 | 40/60 |
| Weight Loss on KOH Treatment (%) | 1.0 | 1.2 | 1.3 | 1.5 | 1.8 |

TABLE 4-continued

|  | Sheet No. | | | | |
| --- | --- | --- | --- | --- | --- |
|  | No. 1 | No. 2 | No. 3 | No. 4 | No. 5* |
| Liquid Retention (%) | 332 | 325 | 310 | 263 | 191 |

Note:
*Comparative Sheet

As is clear from Table 4, Sheet Nos. 1–4 according to the present invention, of which the PSV fiber content is at least 50%, have higher liquid retention performance as compared to Sheet No. 5 for comparison, of which the PSV fiber content is less than 50%.

EXAMPLE 7

Sheets (Sheet Nos. 6 to 9; basis weight: 50 g/m²) were prepared in the same manner as in Example 6, except for using a mixture of PSV fiber No. 14, polypropylene fiber (1.3 denier, cut length: 6 mm) (hereinafter abbreviated as PP), and the same binder fibers as used in Example 6 at a mixing ratio shown in Table 5. The performance properties of the resulting sheets are shown in Table 5.

TABLE 5

|  | Sheet No. | | | | |
| --- | --- | --- | --- | --- | --- |
|  | No. 2 | No. 6 | No. 7 | No. 8* | No. 9* |
| PSV/PP/Binder Fiber Mixing Ratio (%) | 80/0/20 | 60/20/20 | 50/30/20 | 40/40/20 | 20/60/20 |
| Weight Loss on KOH Treatment (%) | 1.2 | 1.3 | 1.3 | 1.2 | 1.3 |
| Liquid Retention (%) | 325 | 305 | 228 | 187 | 141 |

Note:
*Comparative Sheet

As is clear form Table 5, although it is possible to use the other alkali resistant synthetic fiber together with the fiber of the present invention such as Sheet Nos. 6 and 7, it is required to incorporate the fiber of the present invention in the content of at least 50%, in order to obtain high liquid retention performance (i.e., liquid retention of at least 220%).

While the invention has been described in detail and with reference to specific embodiments thereof, it will be apparent to one skilled in the art that various changes and modifications can be made therein without departing from the spirit and scope thereof.

What is claimed is:

1. An alkali-resistant synthetic fiber, comprising:
  a polymer mixture consisting of (A) from 15 to 80% by weight of polysulfone, (B) from 20 to 85% by weight of polyvinyl chloride having a degree of polymerization of from 800 to 2500, and (C) up to 65% by weight of a vinyl polymer selected from the group consisting of polymethylmethacrylate and polystyrene, each based on the total weight of the components (A), (B), and (C).

2. An alkali-resistant synthetic fiber as claimed in claim 1, wherein said polysulfone comprises a repeating unit represented by formula (I):

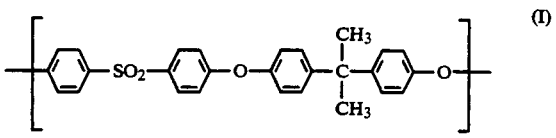

or a repeating unit represented by formula (II):

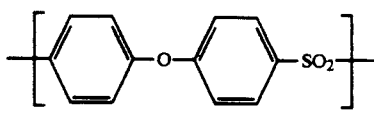
(II)

3. An alkali-resistant synthetic fiber as claimed in claim 1, wherein said fiber has a weight loss of 2.0% or less by weight when boiled in a 30% by weight aqueous solution of potassium hydroxide.

4. An alkali-resistant synthetic fiber as claimed in claim 1, wherein said fiber has a liquid retention of 25% by weight or more.

5. An alkali-resistant synthetic fiber as claimed in claim 1, wherein said fiber has a percentage of shrinkage in boiling water of 25% or less.

6. An alkali-resistant synthetic fiber as claimed in claim 1, wherein said fiber is obtained by dissolving said polymer mixture in a solvent to prepare a spinning solution and extruding the spinning solution into a coagulating bath.

7. An alkali-resistant synthetic fiber as claimed in claim 6, wherein said solvent is selected from dimethylacetamide, dimethylformamide, dimethyl sulfoxide, and acetone and said spinning solution has a viscosity of from 100 to 2,000 poise at 50° C.

8. An alkali-resistant synthetic fiber as claimed in claim 1, wherein said polysulfone is an aromatic polyether polysulfone.

* * * * *